Sept. 30, 1930.   A. L. V. C. DEBRIE   1,777,257
ARRANGEMENT FOR HOLDING OBJECT GLASSES IN
PHOTOGRAPHIC OR CINEMATOGRAPHIC APPARATUS
Filed July 8, 1927   3 Sheets-Sheet 1

INVENTOR
André L. V. C. Debrie
by
Langner, Parry, Card and Langner
Att'ys.

Sept. 30, 1930.  A. L. V. C. DEBRIE  1,777,257
ARRANGEMENT FOR HOLDING OBJECT GLASSES IN
PHOTOGRAPHIC OR CINEMATOGRAPHIC APPARATUS
Filed July 8, 1927  3 Sheets-Sheet 2
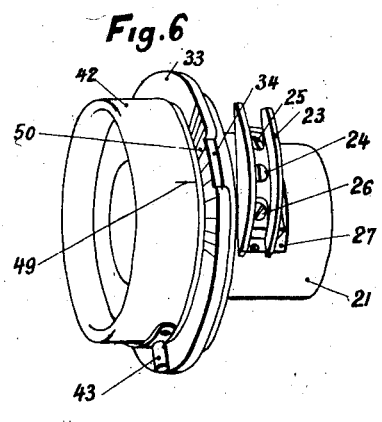
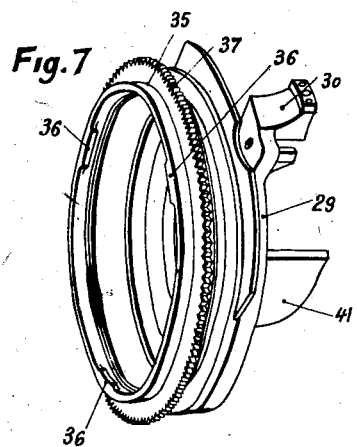
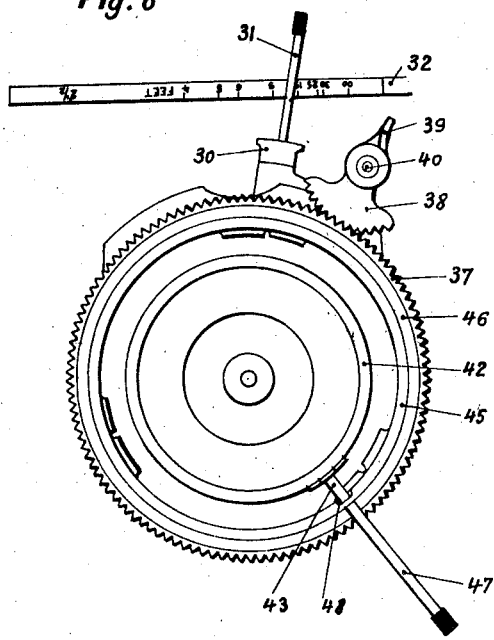
INVENTOR
André L. V. C. Debrie

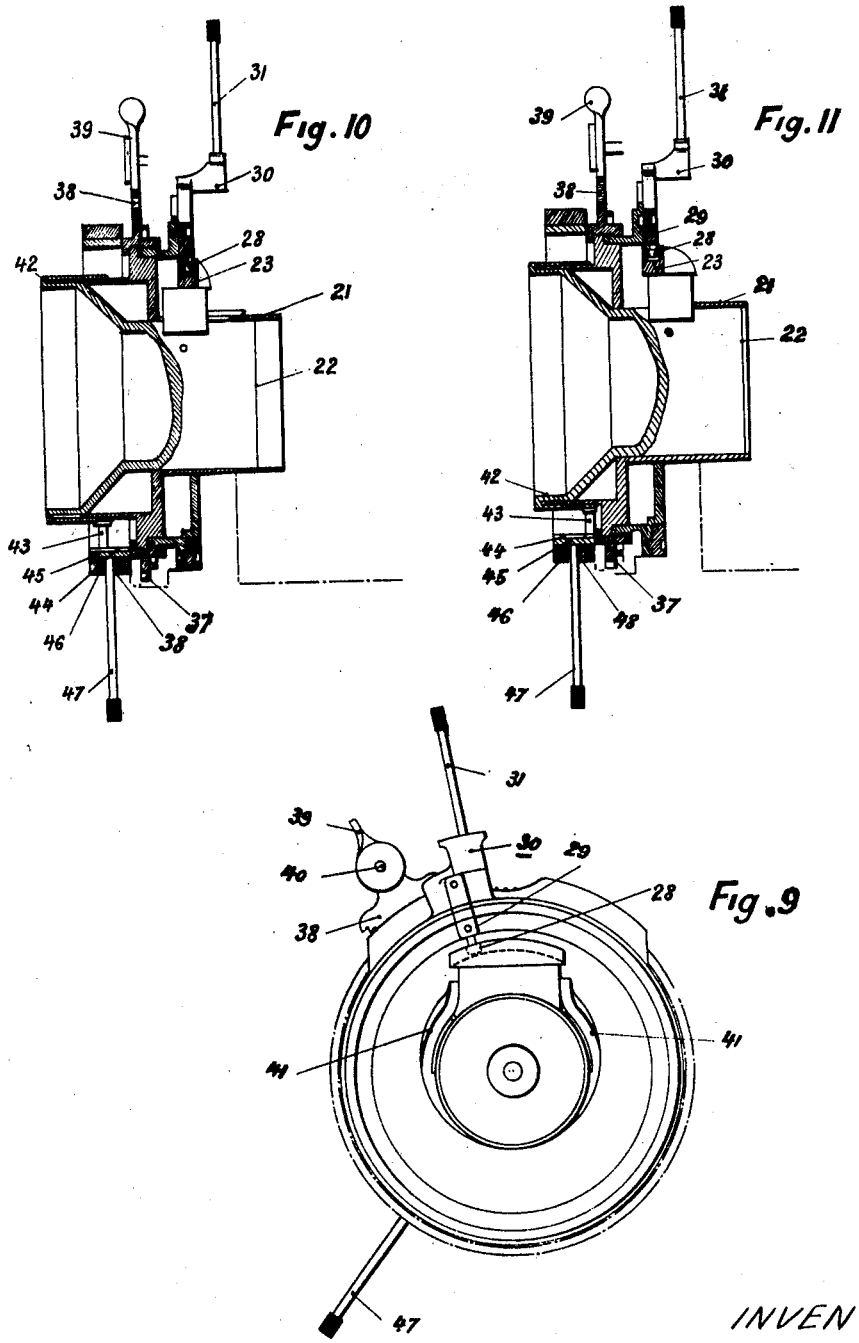

Patented Sept. 30, 1930

1,777,257

UNITED STATES PATENT OFFICE

ANDRÉ LÉON VICTOR CLEMENT DEBRIE, OF PARIS, FRANCE

ARRANGEMENT FOR HOLDING OBJECT GLASSES IN PHOTOGRAPHIC OR CINEMATOGRAPHIC APPARATUS

Application filed July 8, 1927, Serial No. 204,377, and in France October 13, 1926.

My invention has for its object an object glass holder for photographic or cinematographic apparati allowing an easy focussing of the object glass together with a secure holding thereof.

It comprises chiefly a ring secured to the view taking apparatus wherein a hollow object glass holding part is adapted to slide without rotating. This hollow part bears on its rear side a suitably shaped hollow or embossed cam. The sliding of the part is obtained by a part such as a pin or socket secured on the apparatus and engaging the cam. Such a part may be moved in a plane perpendicular to the axis of the object glass by means of a crank for instance.

The cam is built according to the focal length of the object glass so that one single focussing scale is necessary on the apparatus, in front of which scale an index which may be formed by the crank itself is adapted to move.

In particular the cam may be formed of a rectilinear standard part common to all the object glasses but the slope of which changes alone from one object glass to another, the driving of such a cam being provided by a spherical projection.

Special securing means allow the instantaneous setting and removal of the whole object glass holder together with a very easy control of the iris diaphragm.

When the apparatus comprises several object glasses mounted on a turret or on a board, my improved holder may be executed in a manner such as will allow each glass to be focussed as it comes in front of the view taking aperture. In this case it is sufficient for the holder of each object glass to bear a cam shaped according to the focal length of the corresponding glass and adapted to engage the pin or socket borne by the apparatus. This arrangement also allows the simultaneous focussing of the several object glasses of the apparatus whether they are mounted on a turret or on a board: in this case the cam of each object glass holding disc is in contact with a pin or socket borne by the apparatus, the several pins or sockets being adapted to move as one body.

Two forms of execution of my invention are shown by way of example on appended drawings whereof—

Fig. 6 is a perspective view of a second form of execution of the holder.

Fig. 7 is a perspective view of the parts secured on the apparatus and allowing the holder to be moved.

Fig. 8 is a front view of the apparatus showing all the parts illustrated on Fig. 7.

Fig. 9 is a rear view of the same parts.

Figs. 10 and 11 are two cross sections showing the holder set for two different positions of the holder.

Figure 1:
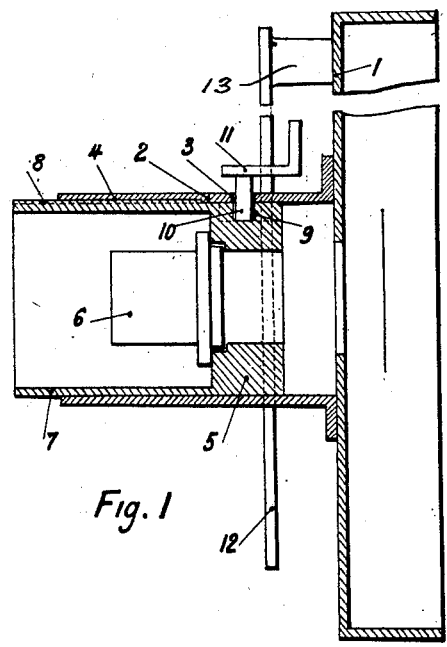
Fig. 1 is a vertical section of a first form of execution of the device.
Figure 2:
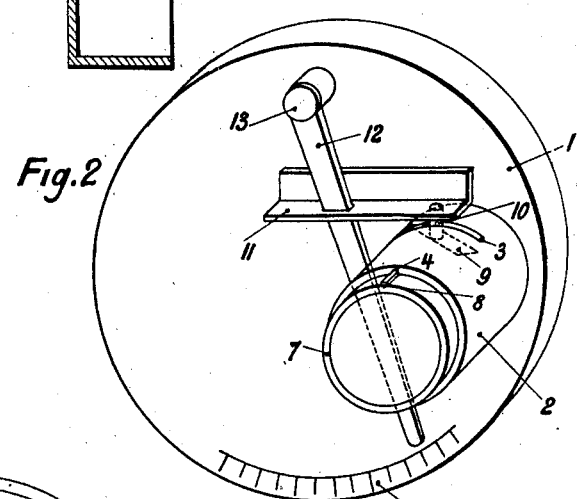
Fig. 2 is a perspective view thereof.

In the form of execution shown on Figs. 1 and 2, the front part 1 of the cinematographic or photographic apparatus bears a socket 2 provided near its rear with a slot 3 perpendicular to its axis. The socket is also provided with an inner groove 4 disposed along one of its generatrices. A hollow part 5 bearing the object glass 6 is adapted to slide inside the socket 2. It extends towards the front as a cylindrical tube 7 provided with a longitudinal key 8 engaging the groove 4 whereby the glass-holder 5 is prevented from rotating inside the socket 2.

In the part 5 is cut a hollow cam 9 adapted to be engaged by the pin 10 passing through the slot 3 of the socket 2 and secured to the movable part 11 borne by the view taking apparatus 1. This part 11 may slide perpendicularly with reference to the object glass axis under the action of the crank 12 pivoting round the axis 13 and one end of which forms an index for the focussing scale 14 borne by the apparatus.

Thus when the part 11 is moved, the pin 10 causes through the cam 9 the object glass 6 and its holder 5 to slide in their socket 2. The length by which they move is determined for a given motion of part 11, by the shape of the cam. This shape being different for each focal length, the scale 14 may serve for glasses of any focal length.

Figure 3:
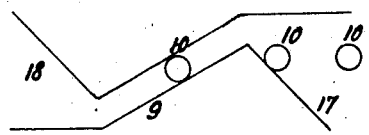
Fig. 3 shows diagrammatically the application of the device to the case where it is to allow the focussing of the several object glasses borne by the apparatus when they are disposed in front of the view taking aperture.

In the form of execution shown on Fig. 3 the cam corresponding to each object glass extends on either side as a slope 17, 18. When a board or turret carrying several glasses is moved in front of the view taking aperture, a moment comes where the slope 17 is met by the pin; henceforward when the whole set of glasses moves the corresponding glass moves inside its socket in a given direction; when the pin 10 engages the cam part 9 the glass and its holder will be displaced in the opposite direction and the focussing will be provided as described hereinabove.

Figure 4:
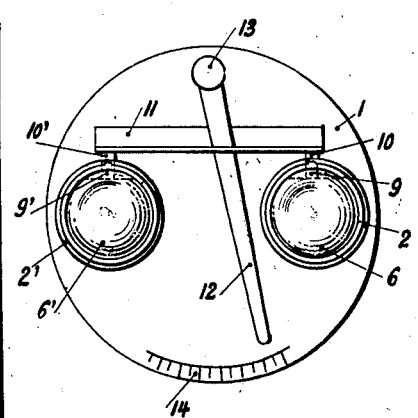
Fig. 4 is a front view of the device used for the simultaneous focussing of two glasses mounted on a board.

In the form of execution shown on Fig. 4 the view taking apparatus 1 comprises two glasses 6, 6' each secured to a holder provided with a cam and adapted to slide respectively in the sockets 2 and 2'. In this case part 11 is provided with two pins 10 and 10' engaging respectively the hollow cams 9 and 9'. Thus these two glasses are simultaneously focussed. If their focal length is different, each cam 9 and 9' having a shape corresponding to this focal length, their simultaneous focussing will still be ensured.

Figure 5:
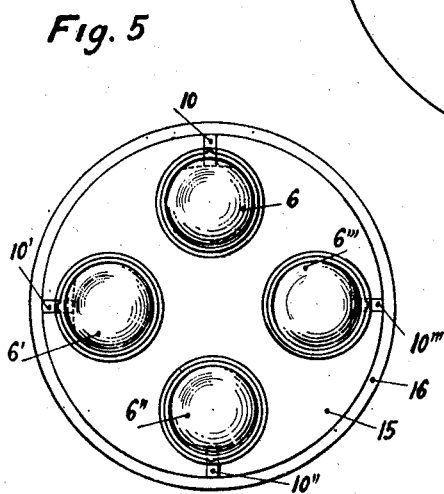
Fig. 5 is a front view of the device used for the simultaneous focussing of more than two glasses mounted on a turret.

The apparatus shown on Fig. 5 comprises four object glasses 6, 6', 6'', 6''' borne by a turret 15 and mounted exactly like in the precedent cases. The pins 10, 10', 10'', 10''' engaging the corresponding hollow cams of the glass holders are borne by a ring 16 adapted to rotate round the axis of the turret 15 and to produce thus the simultaneous sliding of the four glasses in their sockets.

Of course numerous changes may be brought to the above described arrangement without widening the scope of the invention. Thus for instance the socket 2 might instead of being secured directly to the apparatus 1, be removable and be borne by a small ring borne by the apparatus and into which the socket would be suitably fastened. In this case the socket might be smooth inside and the stationary ring might bear a guide for the rear part of part 5 in view of preventing the latter from rotating. This arrangement would allow an easier change of object glasses.

In the form of execution shown on Figs. 6 to 11 the holder comprises a socket 21 inside which the glass-holder 22 (Figs. 10 and 11) is adapted to slide without rotating. This glass-holder bears a projecting cam constituted by a groove disposed between two parallel rectilinear flanges. This cam is a standard part to be used with any object glass, its incline with reference to a cross-section of tube 22 varying alone when glass is changed. In view of this the cam 23 is secured to the tube 22 by means of a central screw 24 and two lateral screws 25, 26 engaging oval holes in the cam 23. The cam 23 projects through an aperture 27 of the socket 21.

The movement of the tube 22 inside the socket 21 is provided by a spherical projection 28 (Figs. 9, 10, 11) secured inside a ring 29 borne by the front of the apparatus and adapted to rotate round its axis. This ring 29 is provided with a projection 30 (Fig. 7) for securing the controlling lever 31. Thanks to its spherical shape, the projection 28 may always pass between the straight flanges of the cam 23, whatever may be incline of the said cam, when it is made to move in a plane perpendicular to the axis of the object glass. The controlling lever 31 moves in front of a scale 32 which is the same for all the glasses used, whatever their focal length (Fig. 8); to the socket 21 is secured a collar 33 (Fig. 6) showing at its periphery a certain number of notches 34, three for instance. On the other hand the front part of the apparatus is provided (Figs. 7 and 8) with an inwardly threaded ring 35 showing three inner projections 36 corresponding with the notches 34 of the holder and an outer peripheral tooth work 37 meshing with a toothed sector 38 carried by the lever 39 and pivotally secured to the spindle 40. This lever 39 moves substantially in the same plane as the lever 31 controlling the movement of projection 28.

Lastly flanges 41 borne by the front of the apparatus (Figs. 7 and 9) serve to guide the cam 23 when it is being set on the apparatus and prevent it afterwards from rotating: the tube 22 is thus obliged to slide inside the socket 21 under the action of the projection 28.

This arrangement allows a prompt and easy setting and removal of the holder which is all the more important as the latter must necessarily be interchangeable. For removing an object glass the lever 31 is pushed as far backwards as possible with the finger so as to release the projection 28 from the groove of cam 23 and at the same time the lever 39 is actuated through the same finger in view of bringing the projections 36 of the ring 35 in front of the notches 34 of the collar 33. The whole arrangement shown on Fig. 6 is then easily removed.

To put a glass back in place, the holder is set in such a manner that the cam 23 is disposed between the flanges 41 and the notches 34 in front of the projections 36; then the levers 31 and 39 are actuated so as to cause the projection 28 to enter the groove in the cam 23 and to block the holder by means of the threaded ring 35.

This arrangement allows the iris diaphragm to be easily controlled: the tube 21 bears the usual antiglare tube 42 projecting to the front of the glass holder: but this tube 42 can, contrary to the usual manner of securing it, rotate with reference to tube 21 and act thereby on the opening of the iris diaphragm. It bears a peripherial projection 43 which engages the longitudinal slot 44 of a movable ring 45 secured inside the stationary ring 46 mounted on the front of the apparatus. To the ring 45 is secured a rod 47 which passes through a slot 48 provided in the stationary ring 46. By actuating this rod 47, the antiglare tube 42 is driven through the ring 45, the slot 44 and the projection 43 and thereby the iris diaphragm is opened or shut. The degree of opening thereof may be read by means of an index 49 (Fig. 6) borne by the tube 42 and moving in front of a scale 50 engraved on the flange 33 of the tube 21.

What I claim is:

1. An arrangement for holding object glasses in photographic or cinematographic apparati comprising a socket borne by the apparatus, a glass-holding part adapted to slide without rotating inside said socket, a cam borne by said part, a projection borne by the apparatus and adapted to engage the cam and to move in a plane perpendicular to the axis of the object glass and a crank controlling the projection.

2. An arrangement for holding object glasses in photographic or cinematographic apparati comprising a socket borne by the apparatus, a glass-holding part adapted to slide without rotating inside said socket, a cam borne by said part, a projection borne by the apparatus and adapted to engage the cam and to move in a plane perpendicular to the axis of the object glass, a crank controlling the projection, an index secured to said crank and a scale of distances borne by the apparatus and cooperating with said index.

3. An arrangement for holding object glasses in photographic or cinematographic apparati comprising a socket borne by the apparatus, a glass-holding part adapted to slide without rotating inside said socket, a cam borne by said part and showing a groove with straight parallel edges, means for varying the incline of this cam on the glass-holding part according to the focal length of the glass used, a spherical projection adapted to move in a plane perpendicular to the axis of the object glass and to engage the groove on the cam, a ring carrying the said projection and adapted to rotate round the axis of the object-glass and a controlling crank on the outside of the ring.

4. An arrangement for holding object glasses in photographic or cinematographic apparati comprising a socket removably borne by the apparatus, a glass-holding part adapted to slide without rotating inside said socket, a cam borne by said part, a projection borne by the apparatus and adapted to engage the cam and to move in a plane perpendicular to the axis of the object glass and a crank controlling the projection.

5. An arrangement for holding object glasses in photographic or cinematographic apparati comprising a socket removably borne by the apparatus, a notched flange on said socket, a glass holding part adapted to slide without rotating inside said socket, a cam borne by said part, a projection borne by the apparatus and adapted to engage the cam and to move in a plane perpendicular to the axis of the object glass, a crank controlling the projection, an inwardly threaded ring borne by the front part of the apparatus and adapted to rotate round the axis of the object glass, projections borne by the said threaded ring and adapted to engage the notches in the socket flange, a tooth work borne by the outside of said ring, a toothed sector pivotally borne by the apparatus and meshing with said toothwork and a lever controlling this sector.

6. An arrangement for holding object glasses in photographic or cinematographic apparati comprising a socket borne by the apparatus, an antiglare tube concentric with the socket and adapted to rotate with reference thereto, means whereby the rotation of this tube actuates the iris diaphragm, a projection on the tube, a lever projecting beyond the apparatus, and controlling said projection, an index borne by the tube, a scale borne by the socket and cooperating with said index, a glass-holding part adapted to slide without rotating inside said socket, a cam borne by said part, a projection borne by the apparatus and adapted to engage the cam and to move in a plane perpendicular to the axis of the object glass and a crank controlling the projection.

7. An arrangement for holding object glasses in photographic or cinematographic apparati comprising a socket borne by the apparatus, a glass holding part adapted to slide without rotating inside said socket, a cam borne by said part, a spherical projection adapted to move in a plane perpendicular to the axis of the object glass and to engage the groove of the cam, a ring carrying the said projection and adapted to rotate round the axis of the object glass and a controlling crank on the outside of the ring.

In testimony whereof I have signed my name to this specification.

ANDRÉ LÉON VICTOR CLEMENT DEBRIE.